(12) United States Patent
Ruud et al.

(10) Patent No.: US 10,460,380 B2
(45) Date of Patent: *Oct. 29, 2019

(54) WEIGH SCALE CERTIFICATION SYSTEM AND ASSOCIATED METHOD

(71) Applicant: CAT Scale Company, Walcott, IA (US)

(72) Inventors: Eric Ruud, Bettendorf, IA (US); Doyle Cone, Dixon, IA (US)

(73) Assignee: CAT Scale Company, Walcott, IA (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/793,558

(22) Filed: Oct. 25, 2017

(65) Prior Publication Data

US 2018/0060952 A1  Mar. 1, 2018

Related U.S. Application Data

(63) Continuation of application No. 13/549,591, filed on Jul. 16, 2012, now Pat. No. 9,830,644.

(51) Int. Cl.
| | |
|---|---|
| *G06Q 40/00* | (2012.01) |
| *H04W 4/40* | (2018.01) |
| *H04W 4/029* | (2018.01) |
| *G06Q 50/26* | (2012.01) |
| *G06Q 90/00* | (2006.01) |
| *H04L 29/08* | (2006.01) |

(52) U.S. Cl.
CPC ............ *G06Q 40/00* (2013.01); *G06Q 50/26* (2013.01); *G06Q 90/00* (2013.01); *H04W 4/029* (2018.02); *H04W 4/40* (2018.02); *H04L 67/12* (2013.01)

(58) Field of Classification Search
CPC ...................................................... G06Q 20/04
USPC ..................................................... 705/35–39
See application file for complete search history.

(56) References Cited

U.S. PATENT DOCUMENTS

| | | | | |
|---|---|---|---|---|
| 4,465,151 | A * | 8/1984 | Gorman | G01G 19/022 177/133 |
| 2013/0018705 | A1* | 1/2013 | Heath | G08G 1/017 705/13 |

OTHER PUBLICATIONS

Integration of Weigh-In-Motion Technologies in road infrastructure management George Yannis University of Athens (Year: 2012).*
STIC search (Year: 2019).*

* cited by examiner

*Primary Examiner* — Bruce I Ebersman
*Assistant Examiner* — John A Anderson
(74) *Attorney, Agent, or Firm* — Nyemaster Goode P.C.

(57) ABSTRACT

A method and system for remotely exchanging weighment information via a wireless device, such as a cell phone, pertaining to a vehicle, such as truck, at a vehicle weight station. The system and method may include determining a present location of a vehicle to be weighed, verifying identification information of the vehicle to be weighed and receiving a vehicle weight from a server remote from the wireless device. The system and method may also include exchanging payment information between one or more servers and a wireless device.

14 Claims, 19 Drawing Sheets

FIG. 10a

CAT Scale Company
Weigh My Truck

APPLICATION SETTINGS

- ACCOUNT SETUP
- EDIT VEHICLE INFORMATION
- MY EMAIL LIST
- WEIGH HISTORY

PROBLEMS/QUESTIONS?
CALL 1-877-CATSCALE - EXT 6

[BACK]

FIG. 10b

CAT Scale Company
Weigh My Truck

VEHICLE INFORMATION

Company: CAT SCALE

Tractor: 123ABC

Trailer: 456DEF

[EDIT] [BACK] [CANCEL]

FIG. 10c

CAT Scale Company
Weigh My Truck

VEHICLE INFORMATION

Company: [CAT SCALE]

Tractor: [123ABC]

Trailer: [456DEF]

[ACCEPT] [BACK] [CANCEL]

FIG. 12a

CAT Scale Company
Weigh My Truck

APPLICATION SETTINGS

- ACCOUNT SETUP
- EDIT VEHICLE INFORMATION
- MY EMAIL LIST
- WEIGH HISTORY

PROBLEMS/QUESTIONS?
CALL 1-877-CATSCALE - EXT 6

[BACK]

FIG. 12b

CAT Scale Company
Weigh My Truck

WEIGHMENT RECIPIENTS

RECIPIENT LIST eric.ruud@iowa80group.com
carey.howard@iowa80group.com
doyle.cone@iowa80group.com
rick.wachal@iowa80group.com
johnsmith@google.com

[ADD] [EDIT] [REMOVE]

Highlight recipient name to EDIT or REMOVE contact

Click ADD to add a new email address

[BACK] [CANCEL]

FIG. 12c

CAT Scale Company
Weigh My Truck

WEIGHMENT RECIPIENTS

ADD RECIPIENT

[                    ]

Type email address in field above and click SUBMIT

EMAIL TYPE

PLAIN TEXT ○
PDF ●

NOTE: emailed .pdf will look like a standard CAT Scale ticket

[BACK] [SUBMIT] [CANCEL]

FIG. 12d

CAT Scale Company
Weigh My Truck

WEIGHMENT RECIPIENTS

EDIT RECIPIENT

[eric.ruud@iowa80group.com]

Type email address in field above and click SUBMIT

EMAIL TYPE

PLAIN TEXT ○
PDF ●

NOTE: emailed .pdf will look like a standard CAT Scale ticket

[BACK] [SUBMIT] [CANCEL]

FIG. 17a

CAT Scale Company
Weigh My Truck

CAT Scale Location #: 0003
Iowa 80 Truckstop
I-80 Exit 284
Walcott, IA

CAT Scale Location #: 0003

[ACCEPT] [CANCEL]

Press ACCEPT if location shown is correct.

If the location shown is not correct, enter the location code located on the intercom sign and press ACCEPT

FIG. 17b

CAT Scale Company
Weigh My Truck

CAT Scale Location #: 0003
Iowa 80 Truckstop
I-80 Exit 284
Walcott, IA

CAT Scale Location #: 0003

Select FIRST WEIGH or REWEIGH

[FIRST WEIGH]
[REWEIGH]

[GO BACK] [CANCEL]

FIG. 17c

CAT Scale Company
Weigh My Truck

CAT Scale Location #: 0003
Iowa 80 Truckstop
I-80 Exit 284
Walcott, IA

Complete all fields and press 'ACCEPT'
Highlight to edit

Company: CAT SCALE
Tractor: 123ABC
Trailer: 456DEF
Commodity: FREIGHT ALL KINDS

[ACCEPT] [BACK] [CANCEL]

FIG. 17d

CAT Scale Company
Weigh My Truck

CAT Scale Location #: 0003
Iowa 80 Truckstop
I-80 Exit 284
Walcott, IA

Fee: $9.50

[ACCEPT] [CANCEL]

FIG. 17e

CAT Scale Company
Weigh My Truck

CAT Scale Location #: 0003
Iowa 80 Truckstop
I-80 Exit 284
Walcott, IA

Steer Axle: 12,000 lb
Drive Axle: 34,000 lb
Trailer Axle: 34,000 lb

Gross: 80,000 lb

[PICK UP TICKET INSIDE]

[DONE]

FIG. 19a

CAT Scale Company
Weigh My Truck

CAT Scale Location #: 0003
Iowa 80 Truckstop
I-80 Exit 284
Walcott, IA

CAT Scale Location #: 0003

[ACCEPT] [CANCEL]

Press ACCEPT if location shown is correct.

If the location shown is not correct, enter the location code located on the intercom sign and press ACCEPT

FIG. 19b

CAT Scale Company
Weigh My Truck

CAT Scale Location #: 0003
Iowa 80 Truckstop
I-80 Exit 284
Walcott, IA

CAT Scale Location #: 0003

Select FIRST WEIGH or REWEIGH

[FIRST WEIGH]
[REWEIGH]

[GO BACK] [CANCEL]

FIG. 19c

CAT Scale Company
Weigh My Truck

CAT Scale Location #: 0003
Iowa 80 Truckstop
I-80 Exit 284
Walcott, IA

Verify all information is correct and press 'ACCEPT'

Company: CAT SCALE
Tractor: 123ABC
Trailer: 456DEF
Commodity: FREIGHT ALL KINDS

[ACCEPT] [CANCEL]

FIG. 19d

CAT Scale Company
Weigh My Truck

CAT Scale Location #: 0003
Iowa 80 Truckstop
I-80 Exit 284
Walcott, IA

Fee: $1.00

[ACCEPT] [CANCEL]

FIG. 19e

CAT Scale Company
Weigh My Truck

CAT Scale Location #: 0003
Iowa 80 Truckstop
I-80 Exit 284
Walcott, IA

Steer Axle: 12,000 lb
Drive Axle: 34,000 lb
Trailer Axle: 34,000 lb

Gross: 80,000 lb

[PICK UP TICKET INSIDE]

[DONE]

WEIGH SCALE CERTIFICATION SYSTEM AND ASSOCIATED METHOD

CROSS-REFERENCE TO RELATED APPLICATION

This application claims priority to U.S. Non-Provisional application Ser. No. 13/549,591, filed on Jul. 16, 2012, entitled WEIGH SCALE CERTIFICATION SYSTEM AND ASSOCIATED METHOD, the disclosure of which is hereby incorporated herein by reference in its entirety.

FIELD

The present invention relates generally to weighment processing and more specifically to a system and process for remotely exchanging weighment information at a vehicle weight station.

BACKGROUND

Trucks and other vehicles are weighed on public weigh scales for commercial purposes including transactions based on weight and to compare actual weights to state limits of weight or to obtain overweight permits. Most states charge and collect significant fines from truck drivers for overweight penalties to prevent harm and promote safety issues related to its roads and bridges.

While the maximum allowed weight varies, the common standard is 80,000 pounds gross vehicle weight. Weight is usually calculated in two measurements: (1) axle weight, the amount of weight carried by each axle and (2) the gross weight, the combined weight of all the axles. To inspect the weight of a truck and its load, weigh stations are equipped with truck scales. There are a variety of scales employed from single axle scales to multi-axle sets. Various systems may be used in truck scales, including, for example, load-cell systems, a bending-plate system, and piezo-electric systems.

In addition to the different types of scales used, there are at least three methods of obtaining the weight of a truck, including a "one-axle" method in which a truck gradually drives across a single scale, stopping each time a set of axles are on the scale. Once the desired axles have been weighed, the total weight of the axle groups are added together to calculate the gross weight. Another method is the "one-stop" method in which a series of scales are used such that the entire truck is weighed at once using multiple platforms placed in a configuration which will place desired axle groups on the individual platforms.

Once weighed, signal lights are often used to indicate if the driver should move the truck from the scales to an inspection area for additional inspection (in the event the truck is determined to be overweight) or if the truck may return to the highway. If a truck weighed at a weigh station is found to exceed the allowable maximum weight, the driver of the truck may receive an overweight ticket and may or may not be required to offload the extra freight. In some states an overweight truck may not be allowed to exit the weigh station until the truck comes into compliance with weight restrictions. Offloading the extra freight may not be practical for items such as, but not limited to, perishable or hazardous loads.

The penalties for a vehicle not falling within the weight guidelines that each state has in place for its road system are often severe. Therefore, a weighing service has been developed which permits a driver the ability to pre-weigh their load prior to encountering a state monitoring site. The weighing services, which may be a certified (i.e., "legal-for-trade") or a compliance weighing, are typically at truck stops which weigh the trucks. If the weighing service indicates that the truck and trailer are overweight, the driver may respond by removing cargo from the trailer and/or readjusting the weight on the trailer bed. The weighing service verifies the weight of the vehicle and issues a receipt of weight to the driver. Although states may not unconditionally recognize these weigh receipts, should the driver be in violation of a state's weight guidelines, the CAT Scale Company may pay the overweight fine or send a representative to appear in court with the driver as an expert witness if the weight shown on the CAT Scale™ weigh receipt indicates that the vehicle is within the legal weight limits.

Because many shippers do not have scales at their facility, truck drivers may not be able to weigh their vehicle and/or verify that the load is properly distributed among the axles prior to reaching a weigh station. As a convenience to truckers, truck scales, such as CAT Scales are available at many truck stops, or remotely attended locations. This allows the driver to weigh the vehicle and/or verify proper load distribution prior to being weighed at a weigh station or passing an electronic weigh station bypass, or in order to obtain permits for overweight vehicles. These scales will give the driver a reading of each axle and/or the gross weight of the axles. In the event one axle is over the maximum allowable weight, weight may be shifted by sliding the fifth wheel or sliding the trailer tandems to adjust the weight distribution among the axles or in the case of a vehicle with fixed axles, the load may be redistributed to obtain weight limit compliance.

SUMMARY

According to an example embodiment, weight data may be fed directly to a customer via a mobile application on the customer's wireless device, and also give the customer the option to receive a weigh ticket if desired. In an example embodiment, the customer may also incur a service fee to use the application in exchange for offering the convenience of limiting 'lost' driving time and other problems known in current weighment procedures.

BRIEF DESCRIPTION OF THE DRAWINGS

One or more example embodiments of the invention are explained in more detail below on the basis of the drawings, in which, schematically:

FIGS. 10a-10c are schematic representations of a user interface according to an example embodiment;

FIGS. 12a-12d are schematic representations of a user interface according to an example embodiment;

FIGS. 17a-17e are schematic representations of a user interface according to an example embodiment;

FIGS. 19a-19e are schematic representations of a user interface according to an example embodiment.

DETAILED DESCRIPTION OF THE EXAMPLE EMBODIMENTS

Figure 1:
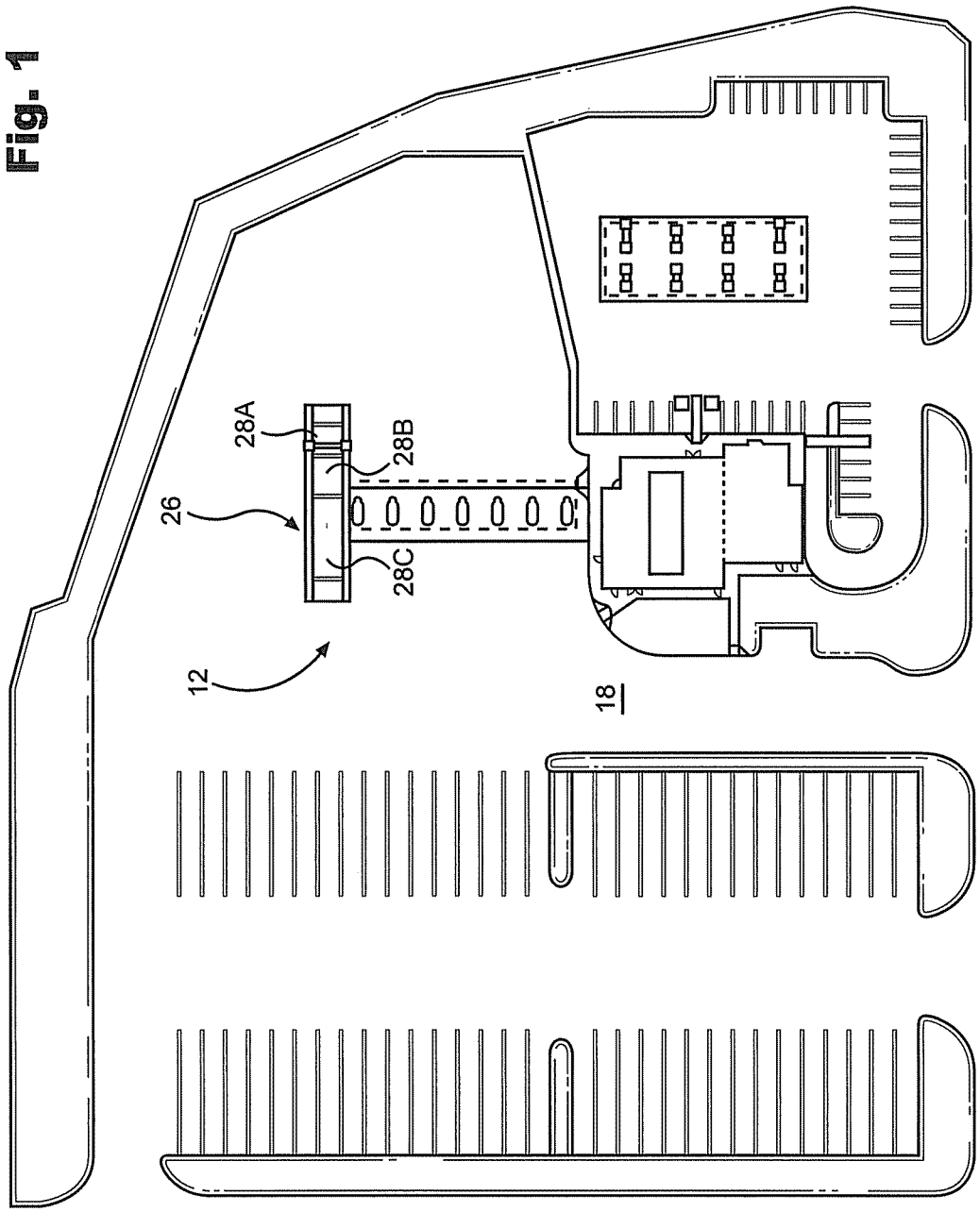
FIG. 1 is a top plan layout of an example weigh site.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular fauns disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As illustrated in FIG. 1, a weigh site 12, such as a truck stop, has a drive path 18 leading to a scale 26. A driver wishing to obtain a weight would enter the scale 26 via the path 18. In various example embodiments, the scale 26 may be a commonly known load-cell system with a strain gauge embedded in it, a column type sensing element with strain gauges attached to them, or a piezo-electric system which uses a series of piezo-electric sensors. The scale 26 may have one or more platforms 28A-C permitting several different weighment types. Typical weighment options provided to a driver may include standard, reweigh, split axle, and double trailer.

In various exemplary embodiments, the methods and systems may be implemented in accordance with different types of vehicle scale equipment that may be used, these include but are not limited to: 1) a one-axle weighing system which uses a single scale and requires a driver to stop each time a set of wheels is on the scale and once all axles have been weighed a gross weight will be calculated; 2) a one-stop scale which uses a series of platforms 28A-C so that the entire vehicle can be weighed at once, calculating both the axle weights and the gross weight in one step, the scales typically connected to a single electronic controller that automatically combines individual scale platform weights to calculate the gross weight; or 3) a weigh-in-motion system which uses sensors to calculate the weight per axle as a vehicle drives over a sensor pad or strip. The weigh-in-motion method does not need for the vehicle to come to a complete stop while on the scales.

Figure 2:
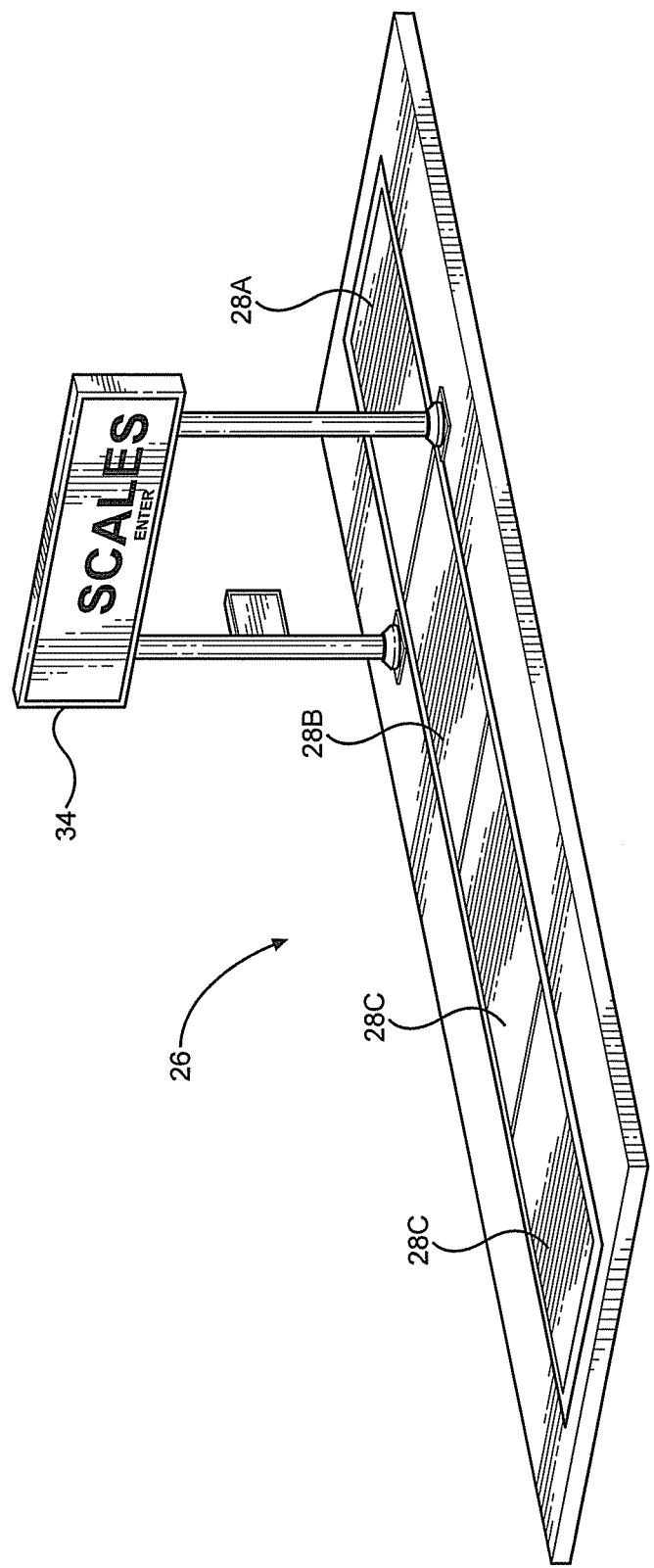
FIG. 2 is a perspective view of an example weigh scale at a weigh site.

As illustrated in FIG. 2, platform 28A is designed to weigh the steer axle, platform 28B is designed to weigh the drive axle(s), and platform 28C is designed to measure the weight of the trailer axle(s). Alternatively, other configurations of platforms 28A-C are available. The scale 26 may also include, for example, a sign 34 (FIG. 3) that the scale under which the tractor cab will be positioned during weighment.

Figure 3:
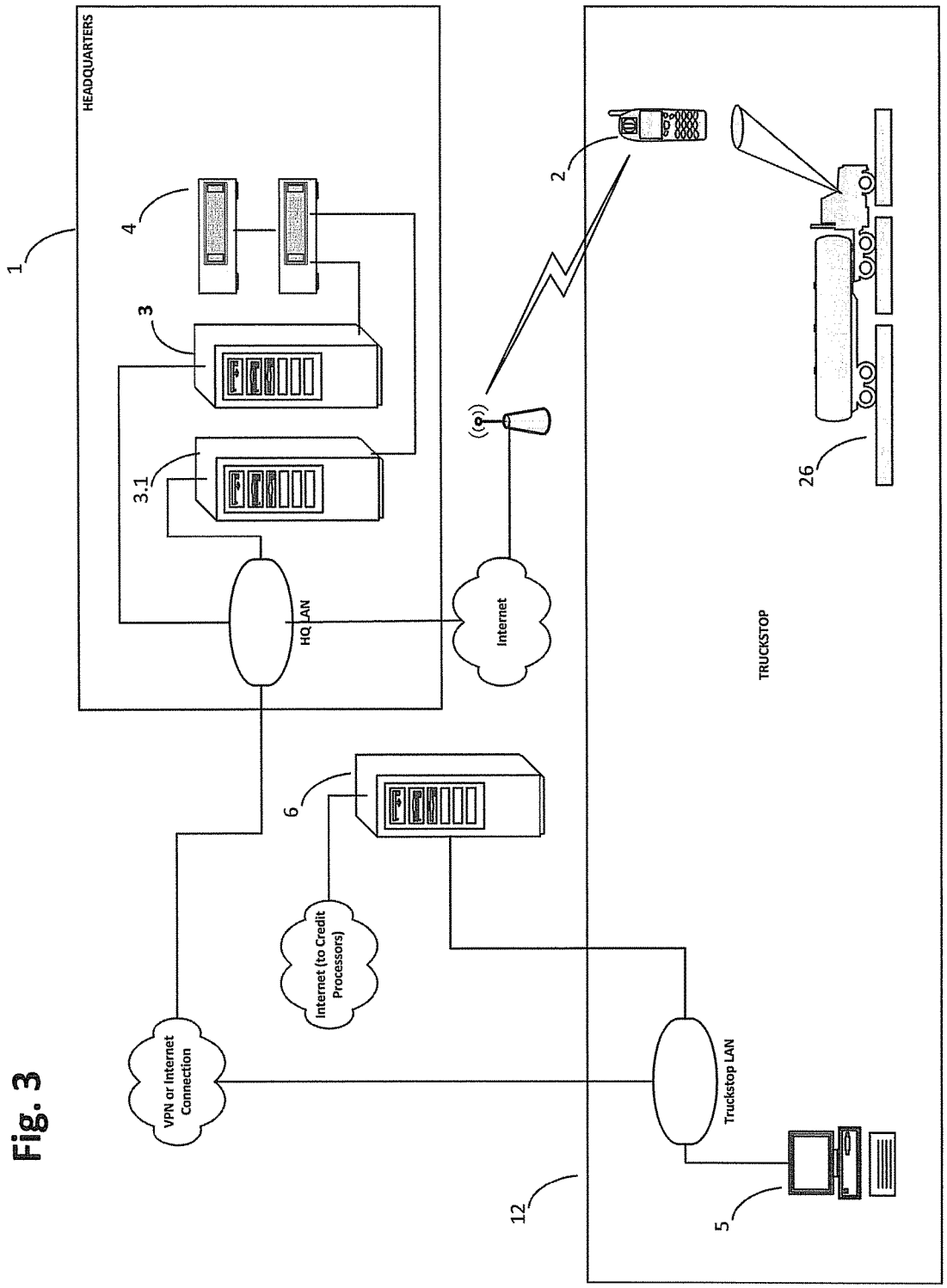
FIG. 3 shows a schematic representation of a weighment application data equipment layout system according to an example embodiment.

As shown in FIG. 3, in an example embodiment, the customer may also utilize a wireless device 2, such as a cell phone, having a mobile application according to the present invention configured to perform the weighment process. An example wireless device is described in more detail below.

In use, the wireless device 2 communicates with a server 3 at a Headquarters 1. The servers 3 are configured to store, transmit, and receive weighment data and account information. The server applications may also act as a 'hub' or a 'gateway' for any 'conversation' from the scale instrument 5 at the remote end to the mobile application resident on the wireless device 2. In an example embodiment, redundant servers 3.1 may be used for the transmittal and receiving of data between an individual scale instrument 5 at a weigh site 12 and the mobile application resident on the wireless device 2 of a customer, along with the option of maintaining account-specific data used for billing, etc. As shown in FIG. 3, the scale 26 and the scale instrument 5 may each be located at the weigh site 12. In various exemplary embodiments, a credit processing server 6 may also be located at the weigh site 12 or at a remote location. In an embodiment, the credit processing server may be a third party payment service such as Paypal™ or the like. The servers 3 (3.1) may also utilize redundant backup of data nightly through the use of network attached storage 4. The scale instrument 5 reads weights from the scale 26 (in raw form) and acts as a point-of-sale with a graphic user interface (GUI).

In an example embodiment, a webserver (not shown) may serve as a 'gateway' for data entry and account maintenance through a web portal for the customer. The entered data would be sent to the server 3 at the Headquarters 1 via an Internet or VPN connection. In an example embodiment, no customer data would be stored on this webserver. In an example embodiment, payment of weighment associated fees may be implemented via a credit processing server 6 connected through a network. Processing of payment may take place between the mobile application and payment server 6.

Wireless Device

Figure 4:
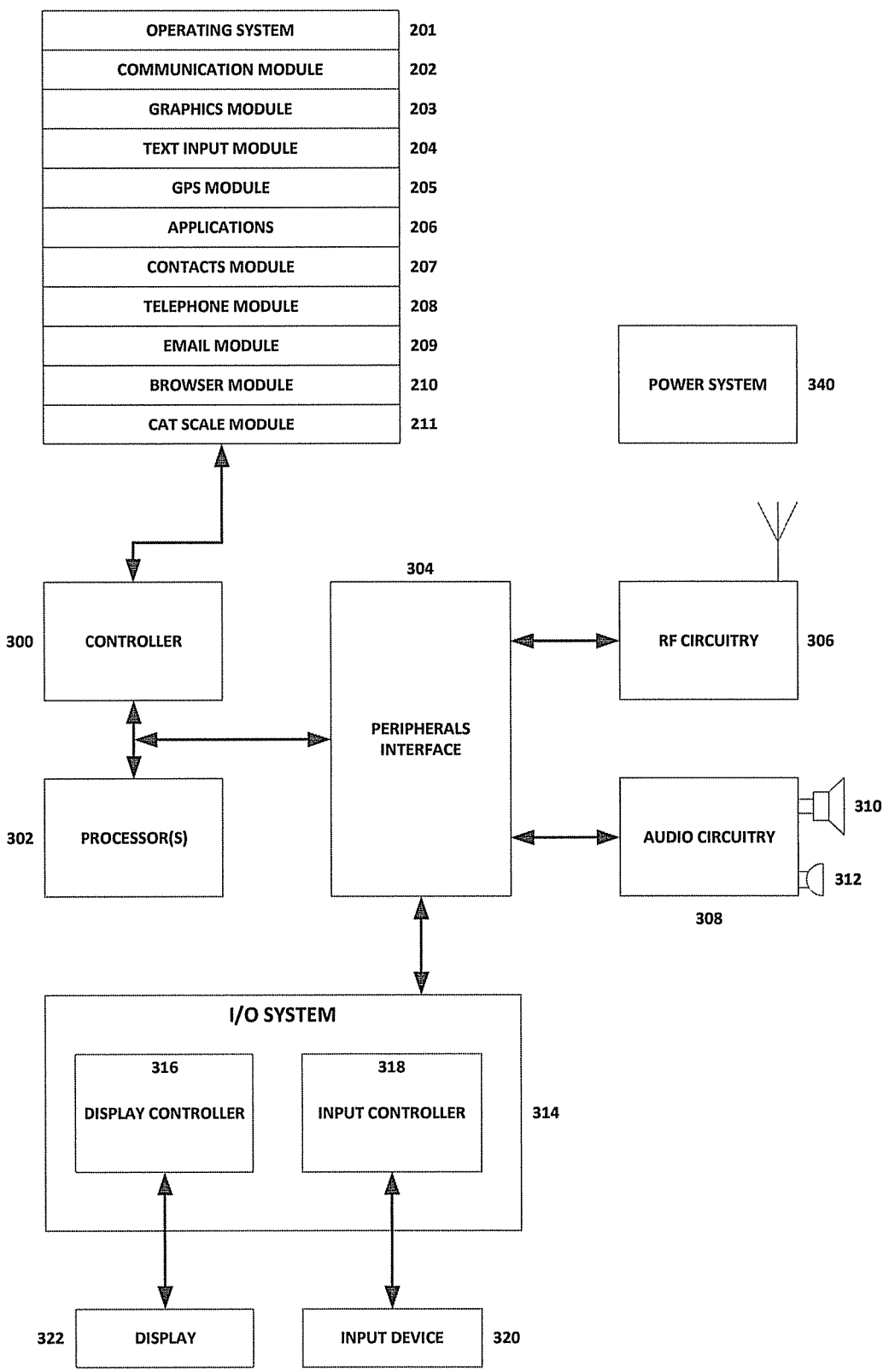
FIG. 4 is a block diagram illustrating a portable wireless device of FIG. 4 according to an example embodiment.

An example wireless device is shown in FIG. 4, where the wireless device 2 includes a memory 200 that may include at least one computer readable storage medium, a memory controller 300, at least one processing unit (CPU) 302, and a peripherals interface 304 operatively interconnected for signal exchange. Radio Frequency (RF) circuitry 306 and audio circuitry 308 (connected to a speaker 310 and a microphone 312) are connected to the peripherals interface 304. An input/output (I/O) system 314 is operatively connected to the peripherals interface 304, and may include a display controller 316 and an input controller 318. An input device 320 and a display device 322 may be connected to the input controller 318 and the display controller 316, respectively. The wireless device 2 also includes a power system 340 for powering the components of the wireless device 2.

In an example embodiment, the power system 340 may include a power management system, at least one power source, such as a battery, a recharging system, a power failure detection circuit, a power converter or inverter, a power status indicator (e.g., a light-emitting diode (LED)) and any other components associated with the generation, management and distribution of power in wireless devices.

In an example embodiment, the memory 200 may include high-speed random access memory and/or non-volatile memory, such as one or more magnetic disk storage devices, optical disk storage devices, flash memory devices, or other non-volatile solid-state memory devices. Access to the memory 200 by other components of the wireless device 2 is controlled by the memory controller 300.

The peripherals interface 304 operatively connects peripherals of the wireless device to the processor(s) or CPU 302 and the memory 200. The at least one processor 302 is configured to execute various software programs and/or sets of instructions stored in the memory 200 to perform various functions for the wireless device 2 and to process data. In various example embodiments, the peripherals interface 304, the processor(s) 302, and the memory controller 300 may be implemented on a single chip or on separate chips.

The RF circuitry 306 is configured to receive and send RF signals. The RF circuitry 306 may include well-known circuitry for converting electrical signals to/from electromagnetic signals and for communicating with communications networks and other communications devices via electromagnetic signals. Such circuitry may include, for example, an antenna system, an RF transceiver, one or more amplifiers, a tuner, one or more oscillators, a digital signal processor, a CODEC chipset, a subscriber identity module (SIM) card, memory, and so forth. The RF circuitry 306 may also communicate with networks, such as the Internet, an intranet and/or a wireless network, a wireless local area network (LAN), and other devices by wireless communication. The wireless communication may use any of a plurality of communications standards, protocols and technologies, including but not limited to global system for mobile communications (GSM), enhanced data GSM environment (EDGE), wideband code division multiple access (W-CDMA), code division multiple access (CDMA), time division multiple access (TDMA), Bluetooth™, wireless fidelity (Wi-Fi) (e.g., IEEE 802.11a, IEEE 802.11b, IEEE 802.11g and/or IEEE 802.11n), voice over Internet protocol (VoIP), Wi-MAX, a protocol for email, instant messaging, and/or short message service (SMS), or any other suitable communication protocol, including communication protocols not yet developed as of the filing date of this application.

The audio circuitry 308, the speaker 310, and the microphone 312 provide an audio interface between a user and the wireless device 2. In operation, the audio circuitry 308 receives data from the peripherals interface 304 and converts the data to electrical signals that are then forwarded to the speaker 310. The audio circuitry 308 also receives electrical signals from the microphone 312. The audio circuitry 308 converts the electrical signals to audio data and transmits the audio data to the peripherals interface 304 for processing. In an example embodiment, audio data may be retrieved from and/or transmitted to the memory 200 and/or the RF circuitry 306 by the peripherals interface 304.

The I/O system 314 operatively connects the display 322 and input devices 320 to the peripherals interface 304. The I/O system 314 may include a display controller 316 and at least one input controller 318 for the input device 320. In operation, the input controller 318 receives and sends electrical signals from and to the input device 320. The input device 320 may include physical buttons (e.g., push buttons, etc.), dials, switches, wheels, and the like to provide user input to the wireless device 2.

The display 322 displays visual output to the user. The visual output may include graphics, text, icons, video, and any combination thereof (collectively termed "graphics"). In addition to providing the display function, the display 322 may also provide an input interface and an output interface between the portable electronic device and a user. The display controller 316 receives and sends electrical signals from and to the display 322. In some embodiments, some or all of the visual output may correspond to user-interface objects, further details of which are described below.

In various example embodiments, the display 322 may be a touch display having a touch-sensitive surface, sensor or set of sensors that accepts input from the user based on contact. The touch display 322 and the display controller 316, as well as necessary associated modules and/or sets of instructions 201-211 in the memory 200, detect contact on the touch display 322 and converts the detected contact into interaction with user-interface objects (e.g., one or more soft keys, icons, images, etc.) being displayed on the display 322. In an example embodiment, a point of contact between a surface of the display 322 and the user corresponds to a finger of the user. The touch screen in the display 322 may use LCD (liquid crystal display) technology, or LPD (light emitting polymer display) technology, although other display technologies may be used in other embodiments. The touch screen in the display 322 and the display controller 316 may detect contact and any movement or breaking thereof using any known touch sensing technologies to determine one or more points of contact with the display 322.

The input device 320 may include any known input device and/or method, such as a physical or virtual click wheel, etc., to input commands to the wireless device 2. In an example embodiment, a user may navigate among and interact with one or more graphical objects or icons displayed on the display 322 by rotating the click wheel or by moving a point of contact with the click wheel and select the icon representing a desired command and/or set of executable instructions. User commands and navigation commands provided by the user via the input device 320 are processed by the input controller 318 and at least one of the modules 201-211 stored in the memory 200. For a virtual click wheel, the click wheel and click wheel controller may be part of the touch screen 322 and the display controller 316, respectively. Although the above embodiments describe a click wheel or virtual click wheel as the input device, any known or to be developed input device usable with the wireless device 2 is contemplated herein.

In various example embodiments, the software components (instructions) stored in the memory 200 may include an operating system 201, a communication module 202, a graphics module 203 a text input module 204, a Global Positioning System (GPS) module 205, and applications 206. The operating system 201 (e.g., Android™, iOS™, Darwin™, RTXC™, LINUX™, UNIX™, OS X, WINDOWS™, or an embedded operating system such as VxWorks™, or other known or to be developed operating system useful in a mobile device) may include various software components and/or drivers for controlling and managing general system tasks (e.g., memory management, storage device control, power management, etc.) and facilitates communication between various hardware and software components. The communication module 202 is configured to facilitate communication with other devices over one or more external ports (not shown) and also includes various software components for handling data received by the RF circuitry 306.

The graphics module 203 may include various known software components for rendering and displaying graphics on the touch screen 322. As used herein, the term "graphics" includes any object that can be displayed to a user, including without limitation text, web pages, icons (such as user-interface objects including soft keys), digital images, videos, animations and the like. The text input module 204 is configured to provide means for entering text, such as a soft keyboard, in various applications described below.

The GPS module 205 is configured to determine the location of the wireless device 2 and to provide the location information for use in various applications, including but not limited to providing a location of a weigh site 12 and/or scale 26.

Applications 206 may include, but are not limited to, a contacts module (i.e., address book or contact list) 207, a telephone module 208, an email module 209, a browser module 210, and a CAT Scale module 211.

Application Acquisition and Set-Up

In an example embodiment, a user of the systems and methods of the present invention may download to their wireless device 2 a software application (i.e., the CAT Scale module) 211 from an appropriate source, such as CAT Scale's website or a vendor of software applications for wireless devices. In an example embodiment, a user of the systems and methods of the present application could download the appropriate Android™ or iPhone™ based application to their wireless device from a source such as, Google Play™, iTunes™, directly from CAT Scale's website, or other source for obtaining software applications.

In an example, embodiment, the application/instructions 211 may be downloaded from such a source through a bi-directional public information transmission line to a user's wireless device 2 connected via the information transmission line from the server apparatus. The application 211 may be downloaded from the server to the user's wireless device 2 in response to the server being accessed by the wireless device 2. The server may receive user identification information and data representative of the application 211 from the wireless device 2. The server may then transmit the application 211 to the wireless device 2.

Once the application has been stored in the memory 200 of the wireless device 2, the application 211 may be launched to set up an appropriate service agreement, pertinent billing information, desired (to be used for field pre-population during the weighment process) vehicle information (company, tractor, or trailer), contacts list, etc. that the user would like to associate with their mobile application account. In an example embodiment, users may also have the option of sending weight data via email to any desired contact(s) using one or more of the contacts module 207, telephone module 208 and email module 209 associated with the memory 200 of the wireless device 2. Account administration may also be handled through the wireless device software application 211, with web access, enabled via the browser module 210, as an additional method.

As shown in an example embodiment at FIG. 5, once the CAT Scale Module or application 211 is successfully downloaded to the memory 200 of the wireless device 2, a user can launch the application 211 at step S1 by selecting the appropriate icon (FIG. 6a) on the display 322 using an input device 320 (although selection of an icon will be discussed throughout this application, it is understood by those of skill in the art that the application may be selected and activated by other known methods). Upon a first launch of the application 211 at step S1, a user may be prompted to set one or more application settings at step S2. As shown in the example block diagram in FIG. 5, the application settings of the application 211 may include, but are not limited to, Account Setup, Vehicle Information, Email List, and Weigh History. An example Graphic User Interface (GUI) displayed on the display 322 of the wireless device 2 representing Application Settings is illustrated at FIG. 6a. The user interface (display screen) 322 includes elements for accessing Account Setup, Edit Vehicle Information, Email List and Weigh History, as well as icons allowing a user to navigate forward and backward in the application.

Figure 6A:
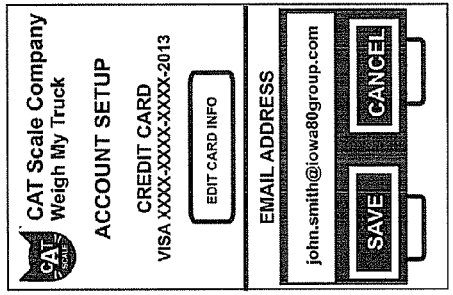
FIGS. 6a-6c are schematic representations of a user interface according to an example embodiment.
Figure 6B:
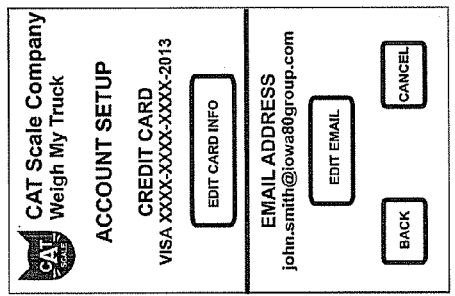
Figure 6C:
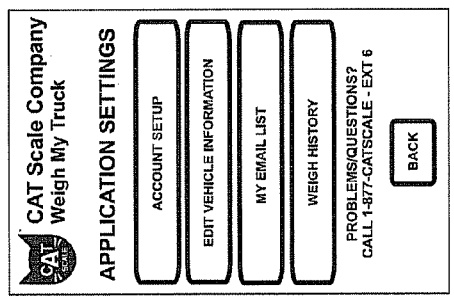
Figure 7:
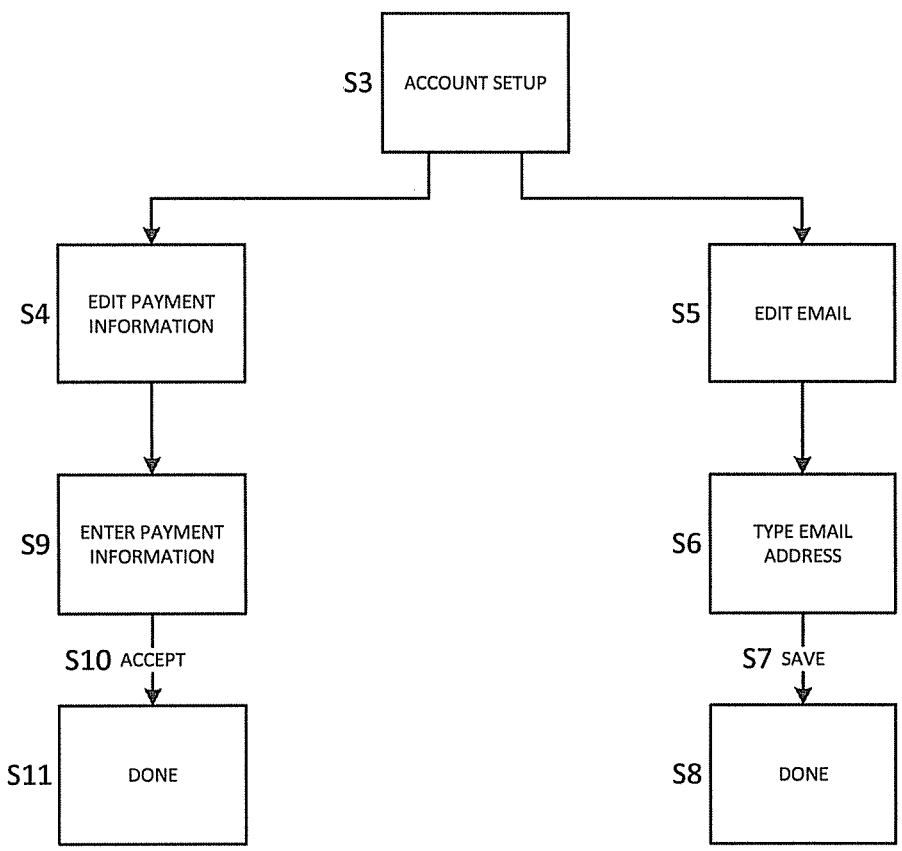
FIG. 7 is a flowchart of application settings, including account set-up, according to an example embodiment.

To setup a new account or to modify an existing account, the ACCOUNT SETUP soft button or icon shown in FIG. 6a is selected according to known touch screen selection methods. Once selected, the GUI shown on the display 322 will change to present the user with necessary prompts to provide account setup information including payment and user email information as shown in FIG. 6b. As shown in FIG. 7, upon selection of the ACCOUNT SETUP button or icon at step S3, the user may proceed to setup payment information (step S4) or user email (step S5) using the GUI shown at FIG. 6b to enter payment information and/or email information. If the user elects to enter user email information, at step S5, the user will select the EDIT EMAIL icon or button shown in FIG. 6b. Selection of the EDIT EMAIL icon or button will cause a change to the GUI shown on the display 322 activating an email entry portion of the GUI shown on the display 322 (FIG. 6c) to allow the user to enter the desired email information at step S6, for example. In an example embodiment, the email entry may be entered using an input device 320 or a soft keyboard of the wireless device discussed above. Once the user email information has been entered at step S6, the user will be prompted to verify the entry at step S7 and as shown at FIG. 6c. If accepted, the Edit Email setup ends at step S8.

If the user selects to enter payment information at step S9, the user will select the EDIT CARD INFO icon or button shown in FIG. 6b. In an example embodiment, selection of the EDIT CARD INFO icon or button will cause a change to the GUI on the display 322 to another configuration (FIG. 8b) to allow the user to enter the desired payment information at step S9, for example. In an example embodiment, the payment information entry may be entered using an input device 320 or a soft keyboard of the wireless device discussed above. Once the payment information has been entered at step S9, the user will be prompted to verify the entry at step S10. If accepted, the Edit Card Info ends at step S11.

Figure 8A:
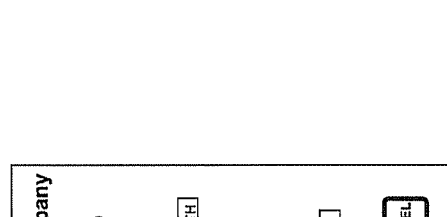
FIGS. 8a and 8b are schematic representations of a user interface according to an example embodiment.
Figure 8B:
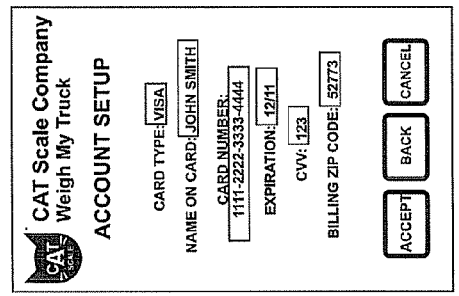

Although certain setup screen configurations are shown herein and described above, one of skill in the art will readily recognize that other screen configurations and prompts may be utilized without departing from the spirit and scope of the present invention. For example, as shown at FIGS. 8a and 8b, setup of payment information may proceed from step S3 to step S4 (FIG. 7). Upon activation of the ACCOUNT SETUP icon or button at step S3, the process may also proceed directly to step S9 (FIG. 7).

Figure 5:
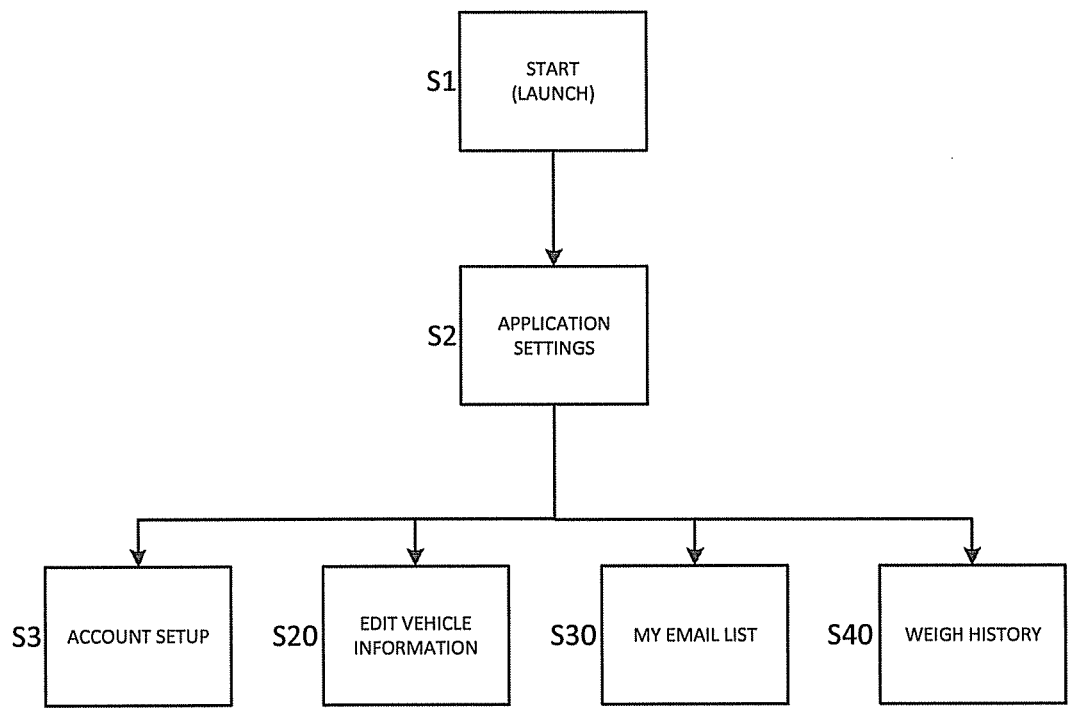
FIG. 5 is a flowchart of application settings according to an example embodiment.
Figure 9:
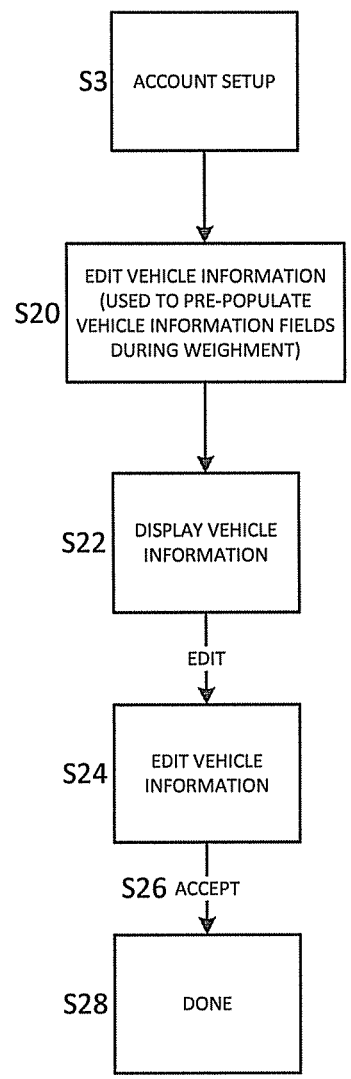
FIG. 9 is a flowchart of application settings, including editing vehicle information, according to an example embodiment.

The setting of Application Settings may also include Editing Vehicle Information at step S20 (FIG. 5). As shown at FIG. 9, the process begins at step S3 and proceeds to step S20 by selecting the EDIT VEHICLE INFORMATION icon or button shown at FIG. 10a, upon activation/selection of the EDIT VEHICLE INFORMATION icon or button, the display screen 322 will change at step S22 to present the user with the current Vehicle Information and user selectable buttons or icons to edit the information, return to the previous screen or to cancel the operation (FIG. 10b). If the user desires to change the current vehicle information, or enter information for the first time, the user selects the EDIT icon or button at step S24 which will activate changeable fields of the display as shown in FIG. 10c. The fields for identifying vehicle information include, but are not limited to, company name, tractor identification information and trailer identification information. Upon entry of the information in the respective fields, the user can accept the entered information at step S26. Once accepted the process ends at step S28 and the user can return to a previous screen or cancel out of setup.

Figure 11A:
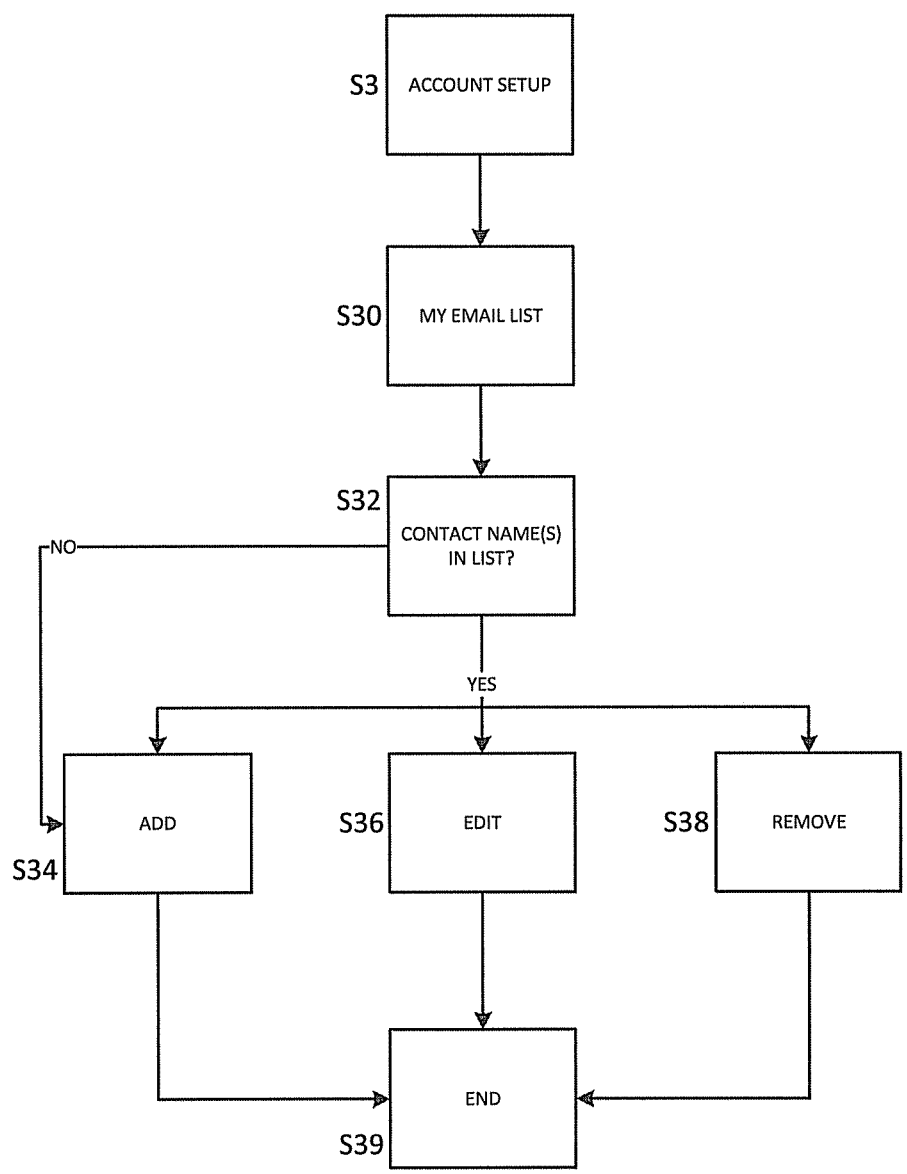
FIGS. 11a-11d are flowcharts of application settings, including editing an email recipients list, according to an example embodiment.
Figure 11B:
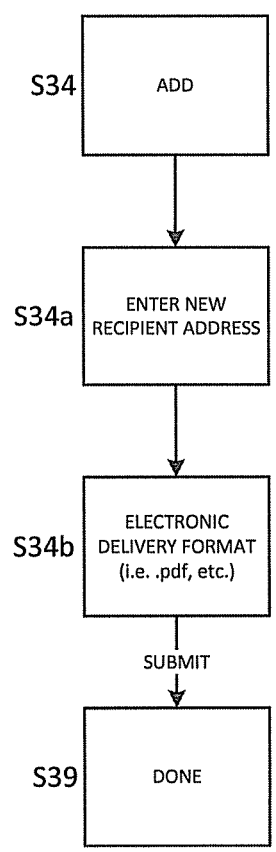
Figure 11C:
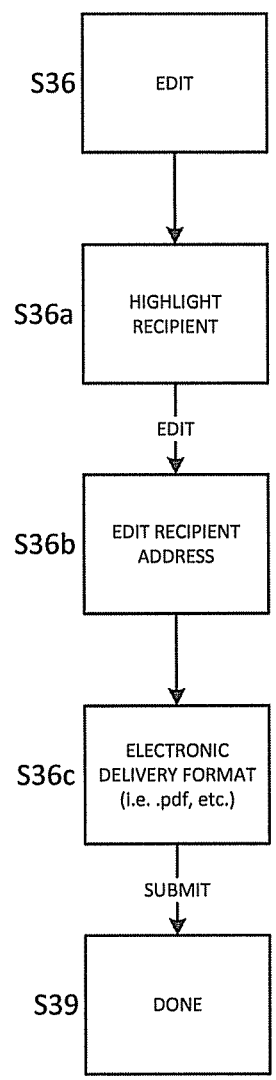
Figure 11D:
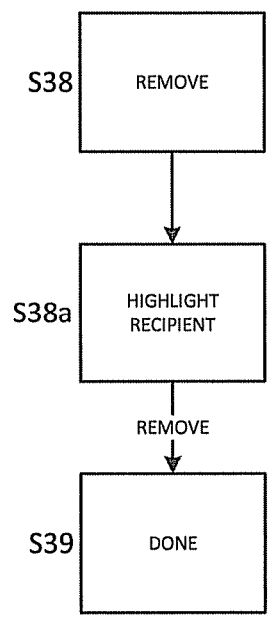

The setting of Application Settings may also include set up of MY EMAIL LIST at step S30 (FIG. 5) to setup and/or edit a list of recipients that the user may desire to receive weighment information. As shown at FIG. 11a, the process begins at step S3 by selecting the MY EMAIL LIST icon or button shown at FIG. 12a. Upon activation/selection of the MY EMAIL LIST icon or button, the display screen 322 will change at step S32 to present the user with current Recipients List and user selectable buttons or icons to add a new contact (FIG. 11b), edit an existing contact (FIG. 11c) or remove an existing contact (FIG. 11d).

Additional buttons or icons for returning to the previous screen or to cancel the operation may also be shown (FIG. 12b). Display of the Recipients List allows the user to determine if a certain desired recipient is currently included in the list. If the desired recipient is not on the list, or if there are no contacts entered (No at step S32), the process proceeds to step S34 whereby a new recipient may be added to the Recipient List by activating the ADD icon or button display on the display 322 (FIG. 12b). Activation of the ADD icon or button results in a change of the screen 322 (FIG. 12c) to display an activated field whereby the user may enter new recipient information at step S34 (shown in detail in FIG. 11b). As shown in FIG. 11b, the process continues to step S34a where a user enters new contact information, such as the address of a new recipient as shown at FIG. 12c. The user may also select a delivery format for information to be sent to the added recipient at step S34b as shown at FIG. 12c. The user may then enter the new information to a memory of the wireless device 2 by activating the SUBMIT icon or button whereby the process ends at step S39.

If the recipient name exists in the Recipients List, the user may optionally edit the name at step S36 or remove the name at step S38 by highlighting the name in the list by activating the name using an input device 320 or the touch screen 322 of the wireless device 2 discussed above. In editing an existing contact (FIG. 11c), the process begins at step S36 where the EDIT button or icon as shown in FIG. 12b and continues to step S36a where a user selects an existing recipient by highlighting the recipient in a Recipient List as shown at FIG. 12b. The process continues to step 36b where the selected recipient address may be edited as shown at FIG. 12d. The user may also select a delivery format (FIG. 12d) for information to be sent to the added recipient at step S36c. The edited information is then submitted and stored in a memory of the device 2 whereby the process ends at step S39.

If a recipient is to be deleted from the Recipients List at step S38, the process begins at step S38 (FIG. 11d) and continues to step S38a where a user selects an existing recipient by highlighting the recipient in a Recipient List as shown at FIG. 12b. The user may then remove the recipient from the Recipient List by activating the REMOVE button or icon as shown at FIG. 12b. The revised Recipient List is then submitted and stored in a memory of the device 2 whereby the process ends at step S39.

In each of the above steps S34 and S36, the user has an option of editing the format by which a selected recipient from the Recipients List will receive information. For example, as shown in FIGS. 12c and 12d, the screen 322 may include selectable fields for an Email Type representative of the format in which the recipient will receive an email message. For example, upon completion of adding a new recipient at step S34 and/or editing an existing recipient at step S36, the process may selectably proceed to step S36 whereby the user may select a "plain text" format of a "PDF format" for messages to be delivered to the selected recipient. In an example embodiment, the selected format of the message would represent a CAT Scale ticket (discussed in greater detail below). Upon selecting the desired format, the process ends at step S39.

Figure 13:
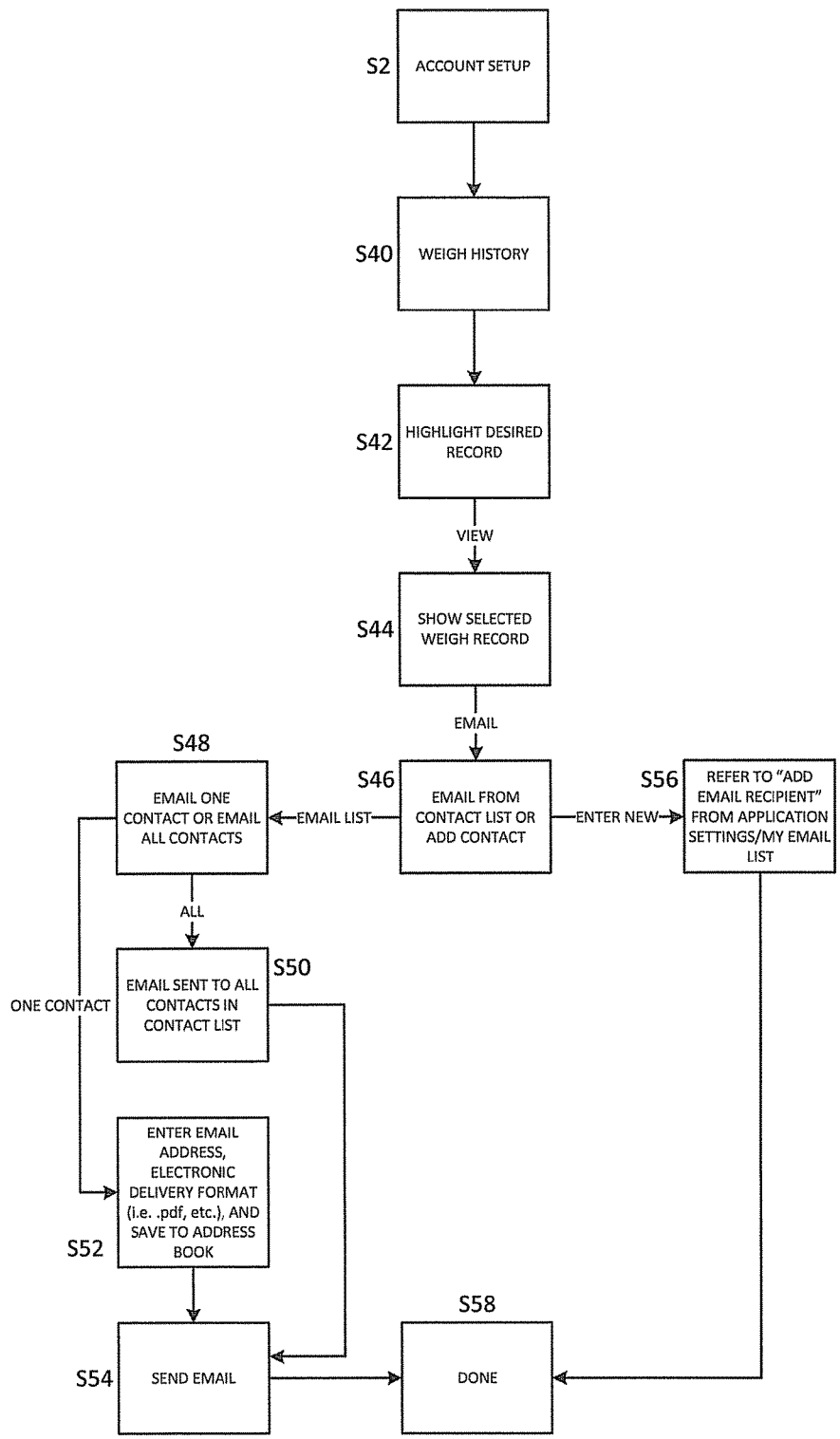
FIG. 13 is a flowchart of application settings, including forwarding a weighment record to a recipient, according to an example embodiment.

The setting of Application Settings may also include set up of Weigh History at step S40 (FIG. 5) which allows a user to view and/or forward weighment history information to one or more recipients from the Recipients List. As shown at FIG. 13, the process begins at step S2 and proceeds to step S40 by selecting the WEIGH HISTORY icon or button shown at FIG. 14a. Upon activation/selection of the WEIGH HISTORY icon or button, the display screen 322 will change at step S42 to present the user with the current Weighment History in list form (FIG. 14b) and user selectable buttons to view a desired entry, for returning to the previous screen or to cancel the operation. In an example embodiment, the list may include, but is not limited to, weighments of the preceding thirty day period.

To select a particular record from the Weighment History, the user would scroll to and/or select a desired record from the list by highlighting the appropriate record in the list by activating the record using an input device 320 or the touch screen 322 of the wireless device 2 as discussed above. Upon selection of the desired record, the screen 322 changes to show the complete detailed record from the list (step S44) as shown at FIG. 14c. If the user determines that the shown selected record of step S44 is correct, an EMAIL icon or button may be selected which activates a prompt for the user to either choose an email recipient from the Recipient List or to add a new recipient at step S46 and as shown at FIG. 14d.

Figure 14E:
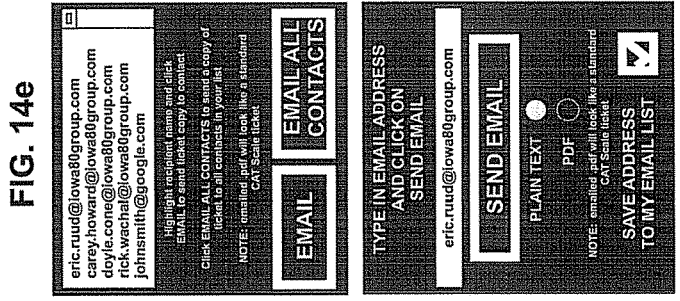
FIGS. 14a-14e are schematic representations of a user interface according to an example embodiment.
Figure 14D:
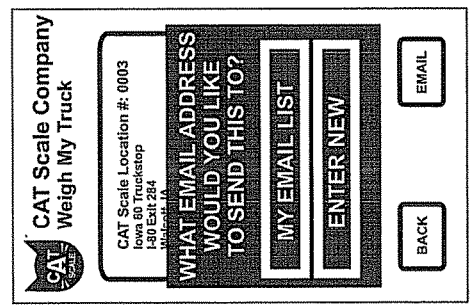
Figure 14C:
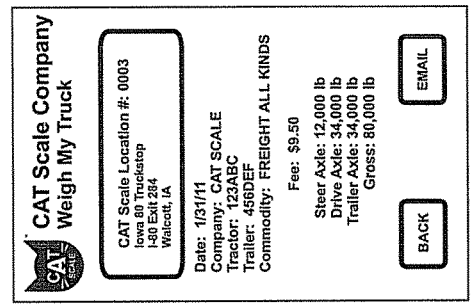
Figure 14B:
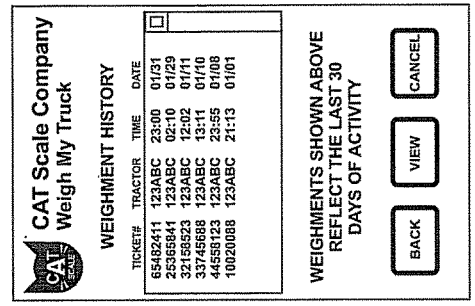
Figure 14A:
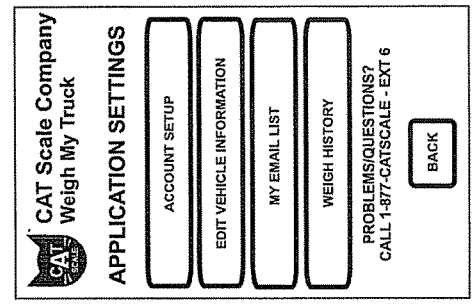

If the user desires to email the weighment record to one or more recipients from the Recipient List, the MY EMAIL LIST icon or button of FIG. 14d is selected and the process proceeds to step S48 whereby the screen 322 changes to provide selectable icons or buttons for the user to select one or more recipients from the Recipients List (FIG. 14e). To send the weighment record to all email contacts in the Recipients List, the EMAIL ALL CONTACTS icon or button is activated (FIG. 14e) and the process proceeds to step S50 whereby the record is sent to all contacts. To send the weighment record to a single contact from among the contacts in the Recipients List, the desired recipient is highlighted as discussed above and the EMAIL icon or button is selected at step S52 and process proceeds to step S54 whereby the email is sent. The process ends at step S58.

In an example embodiment, a user may also send the weighment history to a new contact not on the Recipients List without having to return to the MY EMAIL LIST setup screens. For example, at step S46, the user is presented with a prompt to enter a new address to receive the weighment record (FIG. 14d). In this case, the process proceeds from step S46 to step S56 whereby the user selects the ENTER NEW icon or button which results in a change in the information presented on the screen 322 to provide an active field in which the new recipient information is entered (FIG. 14e). This screen may optionally also provide for selection of the electronic delivery format as discussed above. Once complete, the process proceeds to step S54 whereby the email is sent. The process ends at step S58. The new recipient information and/or electronic delivery format is saved as discussed above.

Application Use

Figure 15:
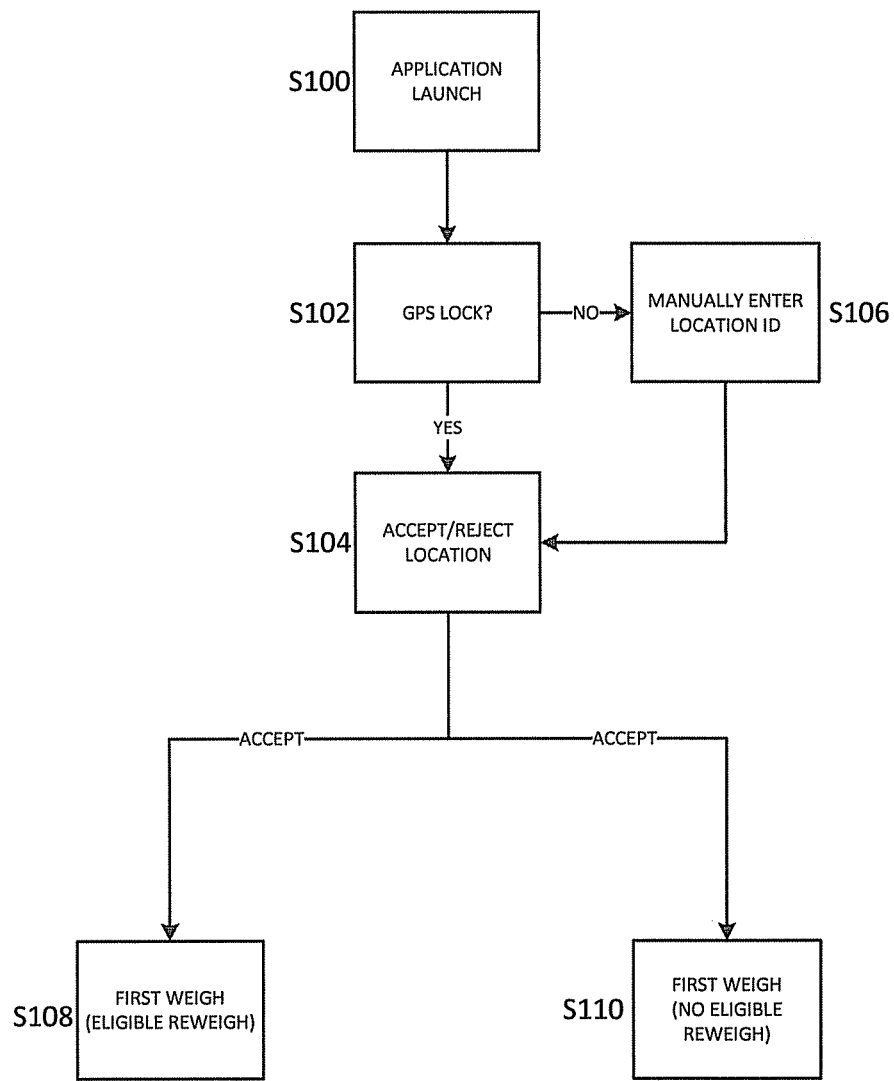
FIG. 15 is a flowchart of application settings representing a weighment process, according to an example embodiment.

According to an example embodiment, as shown in FIG. 1, to initiate weighment of a vehicle, such as a truck, a user would drive a vehicle onto a weigh scale 26. Once the truck is on the scale platform in a position to be weighed, the user may launch the CAT Scale module or application 211 installed on wireless device 2 at step S100 (FIG. 15). The application 211 may be launched by selecting an appropriate icon representing the application that is displayed on the display 322. The icon may be selected by any known method of selecting and launching a software application stored in a wireless device.

Once launched, a representative GUI will be displayed on the display 322 of the device 2 and the process proceeds to step S102 where instructions for obtaining a GPS detected position of the wireless device are executed. A location number and/or location information of the weigh scale 26 on which the truck is currently located will be displayed if the software application 211 was able to obtain a positive GPS lock via the wireless device 2 using the GPS module 205 (see FIG. 16a). According to this feature, known GPS locating methods are employed to locate the wireless device and the acquired location information is input into appropriate fields on the display 322 of the wireless device 2. For example, as shown in FIG. 16a, a GPS lock was obtained for the wireless device 2 using known techniques and methods. The obtained GPS information is then correlated with GPS coordinates of sale locations stored in a memory of the wireless device and, if a match is found, the corresponding scale location is displayed on the wireless device. If the location displayed on the wireless device 2 matches the location of the scale the user can verify the location by activating the ACCEPT icon or button shown on the display 322 at step S104 (FIG. 15). Although the CAT Scale module 211 and the GPS module 205 have been described as separate modules, one of skill in the art would readily recognize that the CAT Scale module 211 is also contemplated to include a GPS module therein.

Figure 16B:
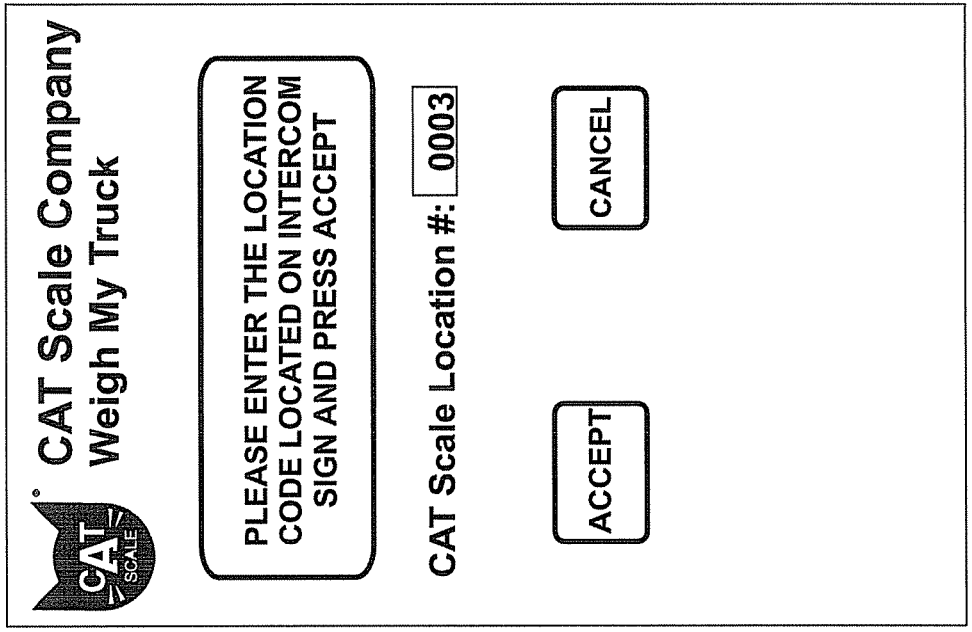
FIGS. 16a-16b are schematic representations of a user interface according to an example embodiment.
Figure 16A:
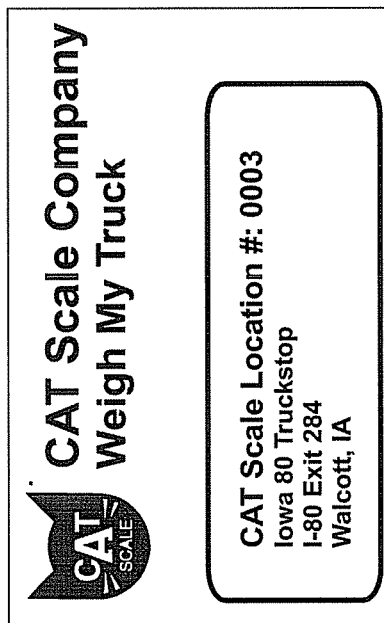

If the location number of the scale 26 obtained by the GPS is not consistent with the number displayed on the display signage containing the location number, the user may reject the GPS located scale number at step S106 by manually typing in the location code from the display signage containing the location number into the CAT Scale location number (CAT Scale Location #:) field as shown in FIG. 16b. Also, if a GPS lock was not able to be obtained by the wireless device 2, or if the customer is at a location having more than one scale in close proximity to one another such that a positive scale identification is not obtainable, the software application 211 may prompt the user to manually input the actual location code of the weigh scale (usually located on the scale, such as at an intercom device or other display signage to confirm the location and/or scale at which the vehicle is requesting the weighment, as shown in FIG. 16b. The user may then proceed to enter the location code using an input device (320, 322) of the wireless device 2 as discussed above.

Once the location is correctly identified and customer accepts the location information at step S104 (FIG. 17a), the application proceeds to determine if there is an eligible "reweigh" stored in the memory 200 of the wireless device 2. A "reweigh" is a discounted weighment available to customers if they weigh their vehicle at the same location with a 24 hour time-span from their original weighment and provided that the vehicle has the same company name, tractor number, and trailer number from the original weighment. For example, a customer may perform a reweigh if the first weigh found their vehicle to be non-compliant with state limits, or if they need a legal-for-trade weight, they will weigh to obtain a full weight and again for an empty weight—the difference between the two is the net weight of the product they are hauling.

Figure 18:
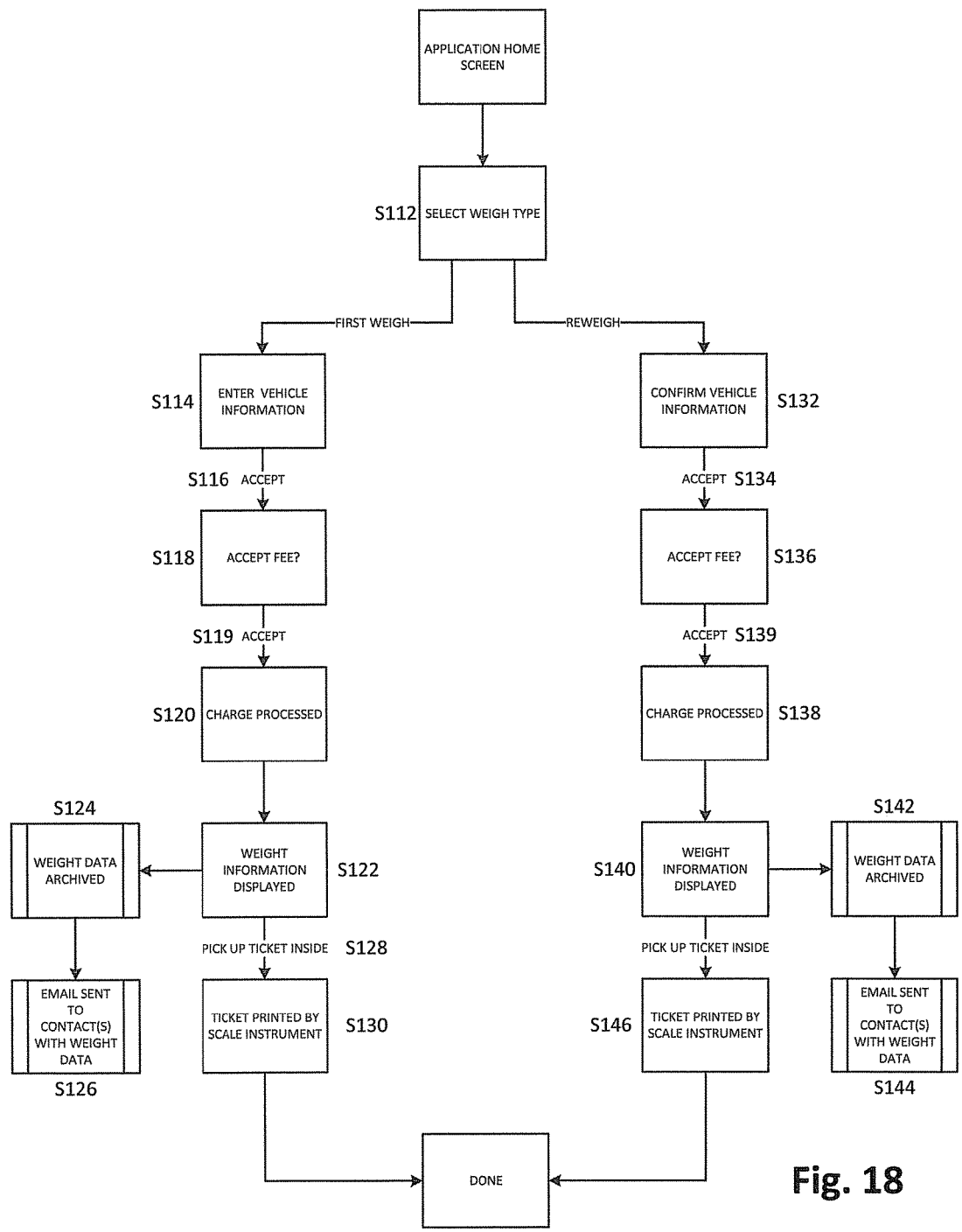
FIG. 18 is a flowchart of application settings representing a weighment process, according to an example embodiment.

If an eligible reweigh is found at step S108, the controller 300 will cause the screen 322 to display selectable buttons or icons of FIRST WEIGH and REWEIGH as shown in FIG. 17b whereby the user will be prompted to select Weigh Type at step S112 of FIG. 18. If there is no eligible reweigh in memory 200 (step S110), then the weighment will be automatically treated as a first weigh (FIG. 18).

In the case of a first weigh at step S114 the user will be prompted to enter necessary information into the wireless device 2 such as, for example, COMPANY NAME, TRACTOR NUMBER, TRAILER NUMBER, COMMODITY, and the like as shown in FIG. 17c. If the user has opted to store any of this information in the memory 200 as described above, these fields will be already populated with the previously entered data when the application 211 is executed on the wireless device 2.

Once the user accepts at step S116 the displayed/entered data, the software application 211 will send this data to the system server 3 (FIG. 3) using the RF circuitry 306 of the wireless device 2. The server 3 will then initiate communication with the scale instrument 5 at the user end in order to place a weighment request and feed the vehicle data to the scale instrument 5.

The scale instrument 5 will receive the vehicle and weighment data, then take the weighment request and (as an option) notify the cashier of the truck stop 12 that a vehicle is on the scale 26 which needs to be verified for proper placement if the need to provide a certified transaction exists. The cashier will then verify proper placement of the vehicle, and will confirm this by entering a unique PIN number into the scale instrument 5. The scale instrument 5 will then post a reply to the system server 3 (CAT Scale Headquarters server) which will contain a weighment type and the appropriate fee for the service. During this process, the scale instrument 5 may 'double check' to verify that the customer is not eligible for a reweigh (if it is, then it will let him/her know by displaying the correct fee), and then reply to the mobile application (through server 3) with the fee amount.

The headquarters server 3 will relay this fee information to the wireless device 2 which will be displayed to the user on the display 322 and the customer will then accept or reject the charges at step S118 (FIG. 17d). Once the charges are accepted by the user, the software application 211 will send an authorization request to the headquarters server 3, which will forward this request to the credit authorization server 6 which will process the transaction charge using account data (either previously setup in the application 211 and stored in a memory 200 of the wireless device, stored on the headquarters server 3 and/or stored in the credit processing server) that was gathered through the initial software application setup and registration. If the authorization request is successful, the authorization server 6 will transmit the acceptance to the headquarters server 3, which will relay this information to the scale instrument 5 and to the wireless device 2 (step S120). If the authorization was unsuccessful, the decline notification will be sent to the headquarters server 3, which will forward this declined authorization attempt to the scale instrument 5 and the wireless device 2 to notify the user that the charge request was declined and the transaction will be aborted.

In an example embodiment, the headquarters server 3 will relay fee information to the wireless device 2 which will be displayed to the user on the display 322 and the customer will then accept or reject the charges at step S118 (FIG. 17d), once the charges are accepted, the software application 211 will send an authorization request directly to the credit authorization server 6 (eg. Paypal, Google Wallet, etc) which will process the transaction charge using account data (either as previously setup in the application 211 and stored in a memory 200 of the wireless device that was gathered through initial software application setup and registration or stored on a credit processing server). If the authorization request is successful, the authorization server 6 will transmit the acceptance to the wireless device 2 (step S120). If the authorization was unsuccessful, the decline notification will be sent to the wireless device 2, which will forward this declined authorization attempt to the scale instrument 5 and notify the user that the charge request was declined and the transaction will be aborted.

In the case of an acceptance, the process proceeds to step S122 whereby the application 211 will feed all applicable identifying weighment data (i.e. Company, Tractor ID, Trailer ID, etc.) to the headquarters server 3. The headquarters server 3 will then forward this data to the scale instrument 5. The scale instrument 5 will then proceed to reply to the headquarters server 3 with the weighment data (i.e. time, date, weights, weighmaster, ticket number, etc.). The headquarters server 3 will store this weighment record data, and relay this information to the software application for display at step S122 to the user on the wireless device 2 (FIG. 17*e*) and for archiving in the memory 200 at step S124.

In addition, any email contacts that the customer specified in their initial setup to receive copies of all weighments may receive emails with a copy of the weighment information at step S126. In an example embodiment, the software application 211 will execute instructions to store (step S124) the last full weigh transaction performed for a period of time (e.g., 24 hours) in the memory 200 to facilitate reweighs (i.e., it will transmit the reweigh number for the user), and may offer the user an option to request a printed ticket (FIG. 17*e*) of the most recent weighment in the event the user opts to proceed to the fuel desk or other site (step 128) to obtain a signed scale ticket. For customers who opt not to enter the truck stop or are not in need of a signed scale ticket the process is complete.

In the case of a reweigh (FIGS. 19*a*-19*e*), rather than a first weigh, the REWEIGH icon or button is selected (FIG. 19*b*) by the user whereby the user will be prompted to confirm the vehicle information previously entered (step S132) shown in FIG. 19*c*. Once the user accepts at step S134 the displayed/entered data, the software application 211 will send this data to the system server 3 using the RF circuitry 306 of the wireless device 2. The server 3 will then initiate communication with the scale instrument 5 at the user end in order to place a weighment request and feed the vehicle data to the scale instrument 5.

The scale instrument 5 will receive the vehicle and weighment data, then take the weighment request and (as an option) notify the cashier of the truck stop 12 that a vehicle is on the scale 26 which needs to be verified for proper placement if the need to provide a certified transaction exists. The cashier will then verify proper placement of the vehicle, and will confirm this by typing in their unique PIN number in the manner discussed above. The scale instrument 5 will then post a reply to the system server 3 (CAT Scale Headquarters server) which will contain a weighment type and the appropriate fee for the service.

The headquarters server 3 will relay this fee information to the wireless device 2 which will be displayed to the user on the display 322 and the customer will then accept or reject the charges at step S136 (FIG. 19*d*). Once the charges are accepted by the user, the software application 211 will send an authorization request to the credit processing server 6 which will process the transaction charge using account data (either previously setup in the application 211 and stored in a memory 200 of the wireless device, stored on the headquarters server 3 and/or stored in the server 6) that was gathered through the initial software application setup and registration. If the authorization request is successful, the process proceeds through steps S138-S146 which substantially equivalent to steps S120-S130 discussed above.

In an example embodiment, a thirty (30) day weighment history will be retained within the memory 200, allowing the user to send emails to the users contact list, or for the user to send a particular weighment to a single 'one-time' email address. These emails can be sent in either a plain-text or watermarked ".pdf" form which will represent a physical CAT Scale ticket. This weighment history is also available for simple viewing by the customer of all weighment record details.

In an example embodiment, the headquarters server 3 will relay fee information to the wireless device 2 which will be displayed to the user on the display 322 and the customer will then accept or reject the charges at step S118 (FIG. 17*d*), once the charges are accepted, the software application 211 will send an authorization request directly to the credit authorization server 6 (eg. Paypal, Google Wallet, etc) which will process the transaction charge using account data (either as previously setup in the application 211 and stored in a memory 200 of the wireless device that was gathered through initial software application setup and registration or stored on a credit processing server). If the authorization request is successful, the authorization server 6 will transmit the acceptance to the wireless device 2 (step S120). If the authorization was unsuccessful, the decline notification will be sent to the wireless device 2, which will forward this declined authorization attempt to the scale instrument 5 and notify the user that the charge request was declined and the transaction will be aborted.

Any of the above-described embodiments may be embodied in the form of an apparatus, method, system, computer readable medium and computer program product. For example, any of the aforementioned methods may be embodied in the form of a system or device, including but not limited to, any of the structures for performing the methodologies illustrated in the drawings.

Even further, any of the aforementioned methods may be embodied in the form of a program stored on a tangible computer readable medium and is configured to perform any one of the aforementioned methods when run on a special purpose computer device (a device including a processor). Thus, the tangible computer readable medium is configured to store information and is configured to interact with a data processing facility or special purpose computer device to execute the instructions stored on the tangible computer readable medium of any of the above mentioned embodiments and/or to perform the method of any of the above mentioned embodiments.

The computer readable medium or storage medium may be a built-in medium installed inside a computer device main body or a removable medium arranged so that the particular device or medium can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An improved method of weighing a vehicle, the method comprising:
    driving a vehicle having at least two axles onto at least two weight scales, each weight scale having a scale platform and receiving at least one axle of the vehicle, the scale platforms each having a separate communications device; wherein driving the vehicle onto the scale platforms results in at least one axle resting on each scale platform;
    communicating from the communications devices of the scale platforms that the at least one axle of the vehicle are on the scale platform;
    providing notification whether the vehicle is being weighed or reweighed, whereby in response to the vehicle being reweighed, the vehicle is eligible for a discounted cost of the weighing;
    communicating from the communications devices the vehicle identifying information to place a weighment request;
    communicating from the communications device to a communications device on each weight scale to authorize the weighment request,
    determining a weighment of the vehicle by the communications devices from weight of the vehicle located on the scale platforms; and
    providing notification of the weighment through a communications device once the determining step is complete;
    the improvement comprising:
    obtaining GPS coordinates of the vehicle through an application on a wireless device;
    correlating through the application the GPS coordinates of the vehicle with weight scale locations stored in a memory of the wireless device, whereby the wireless device displays the weight scale location associated with the GPS coordinates;
    determining through stored information in the wireless device whether the vehicle is eligible for a discounted weighment, in which case if it is the wireless device automatically populates vehicle identifying information into the application, and in which case if it is not vehicle identifying information is inputted into the application;
    communicating vehicle identifying information from the application to the weight scale to place a weighment request;
    communicating from the communications devices of the scale platforms that a vehicle on the weight scale needs to be verified for proper placement on the scale platform of each of the at least two weight scales, wherein verification of proper placement on the scale platforms is entered into the weight scale;
    replying from the communications devices of the weight scale to a scales server containing a weighment type and providing appropriate weighment fee;
    relaying the appropriate weighment fee from the scales server containing a weighment type to the wireless device, whereby a user accepts or rejects the weighment fee on the application;
    sending an authorization request from the wireless device to the scales server once the weighment fee has been accepted, whereby the scale server then relays, through a communications network, the authorization request to a credit authorization server to process payment of the weighment fee using payment data provided to the application;
    relaying weighment data from the application to a web server once the authorization request is accepted, whereby the scale server then forwards the weighment data to the weight scale; and
    relaying weighment data from the weight scale to the web server, whereby a host server stores and archives the weighment data and relays the weighment data to the application for display on the wireless device.

2. The method of claim 1 further including the step of the user selecting an appropriate icon representing the application on a display of the wireless device.

3. The method of claim 1 further including the step of displaying a location number and/or location information of the weight scale location on a display of the wireless device.

4. The method of claim 1 further including the step of the user verifying the weight scale location by activating an ACCEPT icon or button shown on a display of the wireless device.

5. The method of claim 1 further including the step of the user rejecting the weight scale location in the event the weight scale location is not correct.

6. The method of claim 5 whereby the user rejects the weight scale location by entering a correct scale location code into the wireless device.

7. The method of claim 1 further including the step of the weight scale double checking to verify that the vehicle is not eligible for a reweigh.

8. The method of claim 7 further including the step of relaying from the scale a corrected fee to the wireless device if the vehicle is eligible for reweigh.

9. The method of claim 1 further including the step of the application offering the user an option of requesting a printed weigh ticket.

10. The method of claim 1 further including the step of storing weighment history of the vehicle for at least 30 days.

11. The method of claim 1 whereby the determining reweigh step comprises determining whether the vehicle has the same company name, tractor number, and trailer number from a previous weigh within a 24 hour time span.

12. The method of claim 1 further including the step of e-mailing the weighment information to a new contact.

13. The method of claim 1 further including the step of e-mailing the weighment information is e-mailed to one or more recipients from the user's e-mail contacts stored in the wireless device.

14. The method of claim 1 further including the step of e-mailing the weighment information to one or more recipients.

* * * * *